Figure 1:
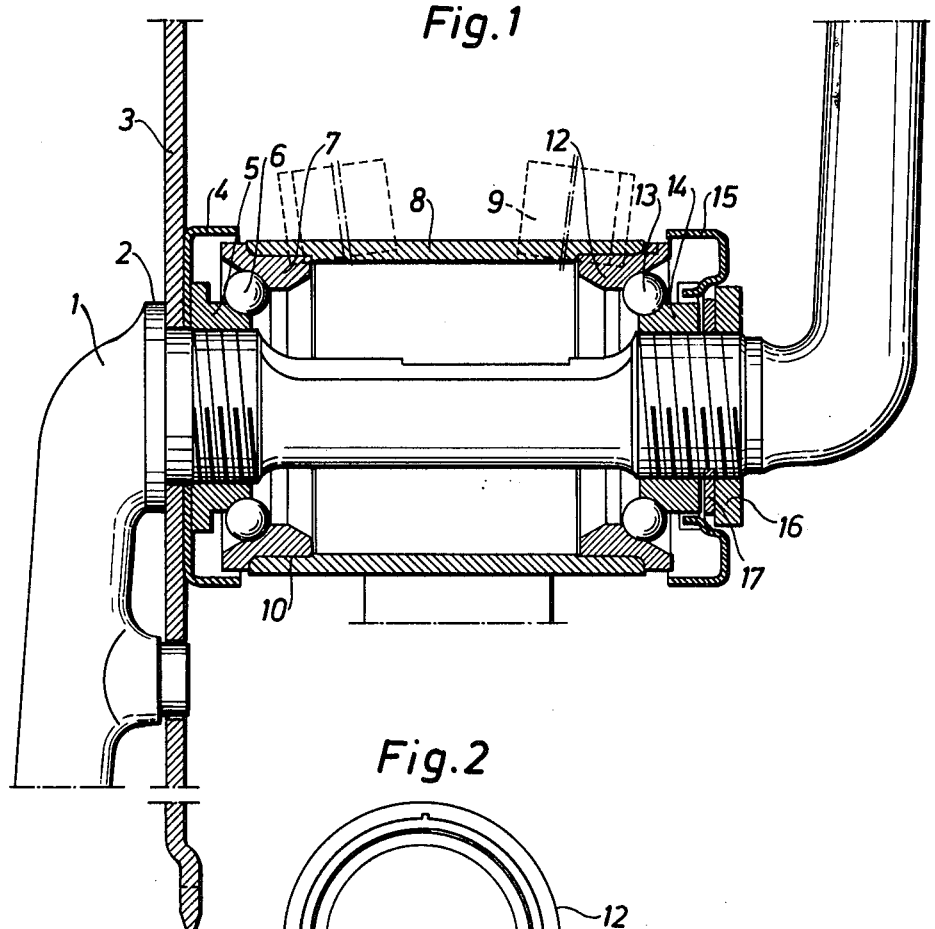

United States Patent [19]

Liljequist

[11] 4,089,540
[45] May 16, 1978

[54] CRANK BEARING DEVICE FOR PEDAL VEHICLES

[75] Inventor: Sten Ivar Helmer Liljequist, Varberg, Sweden

[73] Assignee: Monark-Crescent AB, Varberg, Sweden

[21] Appl. No.: 732,932

[22] Filed: Oct. 15, 1976

[30] Foreign Application Priority Data

Oct. 24, 1975 Sweden .............................. 7511914

[51] Int. Cl.² ........................ B62M 3/00; F16C 13/02
[52] U.S. Cl. ..................................... 280/259; 29/525; 308/192
[58] Field of Search ................ 280/259; 308/192, 190, 308/191, 179.5; 29/525, 432

[56] References Cited

U.S. PATENT DOCUMENTS

| 616,205 | 12/1898 | Shamp ................................. 308/192 |
| 2,779,641 | 1/1957 | Sutowski .............................. 29/525 |
| 3,245,273 | 4/1966 | Loper et al. .......................... 29/525 |
| 3,919,898 | 11/1975 | Sugino ................................. 308/192 |

Primary Examiner—Joseph F. Peters, Jr.
Assistant Examiner—Donn McGiehan
Attorney, Agent, or Firm—Charles A. Laff; J. Warren Whitesel; Howard B. Rockman

[57] ABSTRACT

A crank bearing device for pedal vehicles comprises a cylindrical crank bearing shell, which is connected to the vehicle frame. A crank passes through this shell with a ball bearing bushing at each end of the crank arm. Between each of such a bushing and a cone, threaded onto the crank, are placed a number of ball bearings. The invention provides that these bushings have a cylindrical outer surface cooperating with a cylindrical inner surface of the shell and are provided with a number of low, protruding ribs. Through driving the bushing into the shell the ribs are forced into the material of the shell, thereby interconnecting the bushing and the shell with each other.

1 Claim, 2 Drawing Figures

CRANK BEARING DEVICE FOR PEDAL VEHICLES

This invention relates to a crank bearing device for pedal vehicles comprising a cylindrical crank bearing shell connected to the vehicle frame. Passing through the shell is a crank and which has on each of its ends, a ball bearing bushing, ball bearings are placed between the bushing and a cone threaded onto the crank.

Normally, these two ball bearing bushings are connected by threads to the crank bearing shell. However, from the point of view of production, the threading is a comparatively time-consuming procedure and furthermore it often happens that the thread engagement loosens during the use of the vehicle and after a number of service actions.

It is an object of the present invention to eliminate these disadvantages. Thus, the invention is characterized in that a cylindrical outer surface of the ball bearing bushing cooperates with a cylindrical inner surface of the crank bearing shell and is provided with a number of protruding, low ribs. The ball bearing bushing is driven into the shell and forced into the material of the shell, thereby connecting these two parts with each other.

Figure 2:
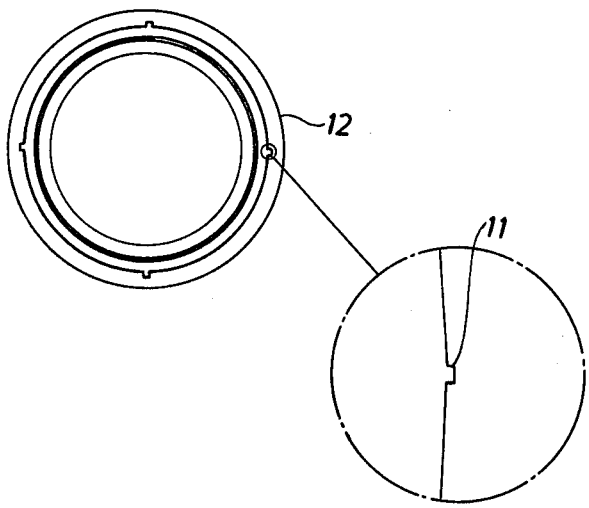

An embodiment of the invention will now be described with reference to the accompanying drawings, in which:

FIG. 1 is a crank bearing, shown from the front of the vehicle, to which bearing the device according to the present invention is applied, and FIG. 2 is the right crank bearing bushing included in the same crank bearing and shown from the left side, according to FIG. 1, with one detail enlarged.

In the drawing, a crank 1 is provided with a flange 2, against which is placed a chain wheel 3. This chain wheel is furthermore unrotatably connected to the crank 1. Inside the chain wheel 3, the crank has a dust cap 4, which together with the chain wheel 3 is held in place by means of a cone 5 threaded onto the crank. In this cone, is formed a ball race for ball bearings 6. A corresponding ball race for the ball bearings 6 is formed in a crank bearing bushing 7, located in the left end of a cylindrical crank bearing shell 8, rigidly connected to the vehicle frame 9.

According to the invention, a cylindrical outer surface 10 of the bearing bushing 7 cooperates with a cylindrical inner surface of the shell 8, at its left end, and is provided with a number of low, protruding ribs 11 (see FIG. 2), in the present example four in number. These surfaces and ribs are so dimensioned that by driving the bearing bushing 7 into the bearing shell 8, the ribs 11 are forced into the material of the shell, thereby interconnecting these two parts with each other. However, it is possible, when service actions are required, to pull out or to press out the bearing bushing 7 from the shell 8. When the bearing bushing is to be replaced, it be recommended that it is given a new rotational position in relation to the shell 8, so that the ribs 11 will not be twice located in the same position. If the position is the same, the connection may be less satisfactory.

In the right end of the crank bearing shell is inserted a crank bearing bushing 12 corresponding entirely to the bearing bushing 7 and arranged in exact the same way. Against the bearing shell 12 is placed a ball bearing 13, which together with other parts of the bearing is held in the correct place by a cone 14 threaded onto the crank 1. In the cone 14 is inserted a dust cap 15. In order to lock the cone in the position to which it has been adjusted, a locking nut 16 is provided. This nut is threaded onto the crank 1 and is through a locking washer 17 forced against the cone 14. The specification is to be construed broadly enough to cover all equivalent structures falling within the true scope and spirit of the appended claims.

I claim:

1. A crank-bearing device for pedal vehicles comprising a cylindrical crank-bearing shell having a central axis connected to the vehicle frame, crank means having an arm passing axially through by the bearing shell, a ball bearing bushing on each end of the crank arm passing through the shell, cone means attached onto the crank with a plurality of ball bearings, positioned between said ball bearing bushing and said cone, a cylindrical outer surface of said ball bearing bushing cooperating with a cylindrical inner surface of said crank-bearing shell, and a plurality of low, protruding ribs formed at spaced intervals on said bushing parallel to said axis, said bushing being mounted in said crank-bearing shell by driving the ball-bearing bushing into the shell, thereby forcing said ribs into the material of the shell in order to connect these two parts with each other.

* * * * *